UNITED STATES PATENT OFFICE.

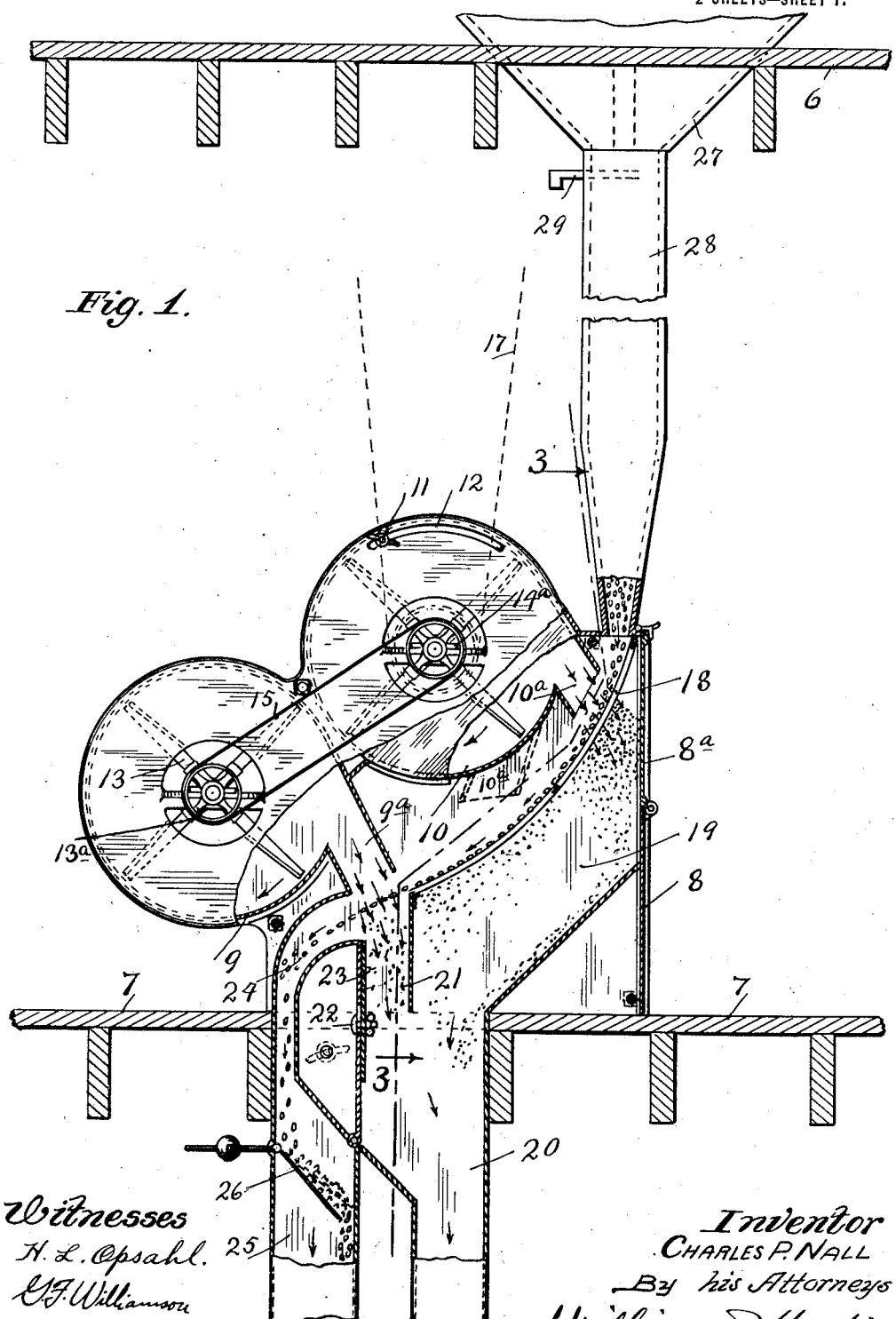
C. P. NALL.
GRAIN SEPARATOR.
APPLICATION FILED OCT. 28, 1916.
1,333,127. Patented Mar. 9, 1920.

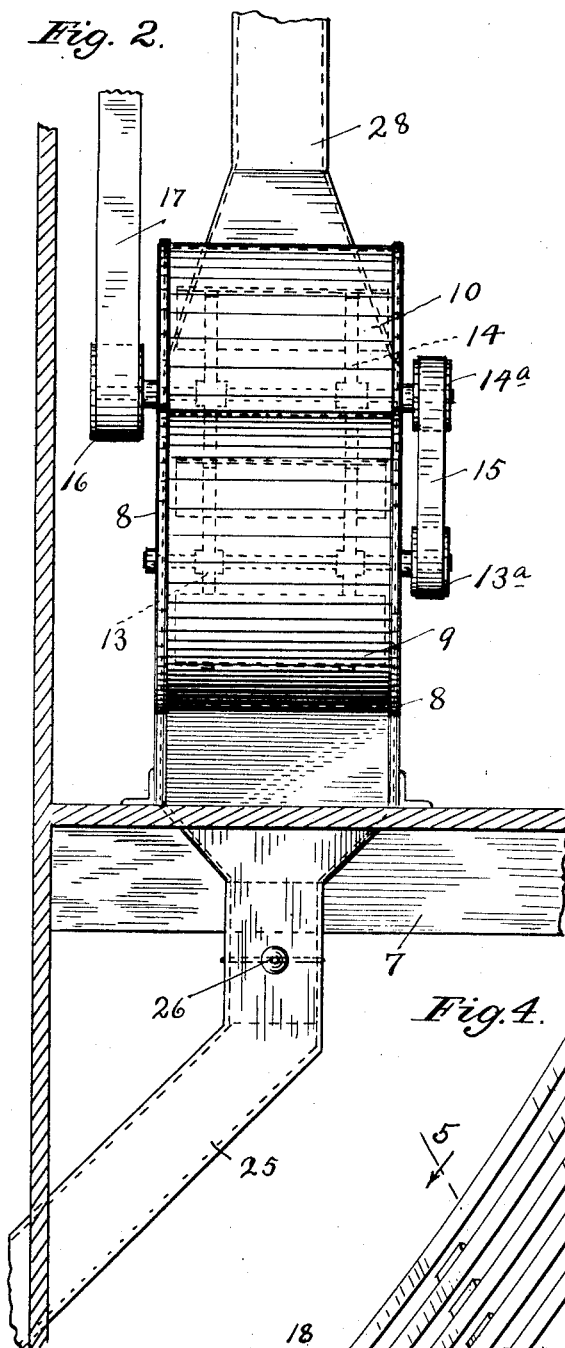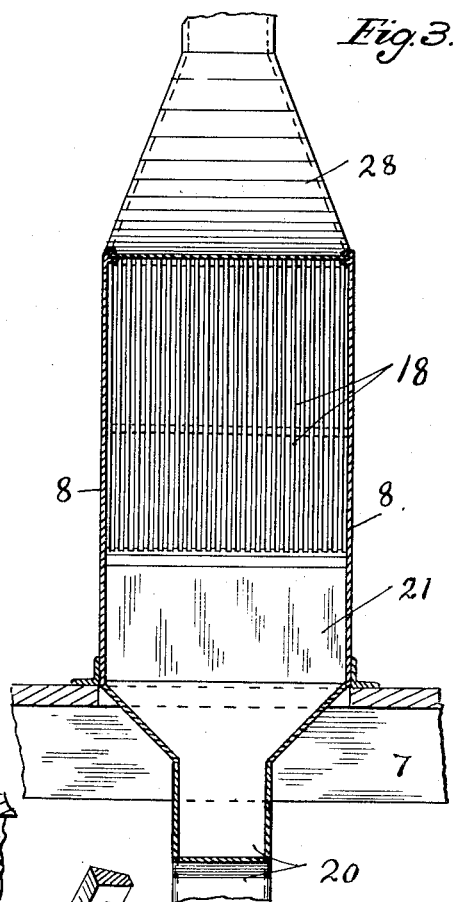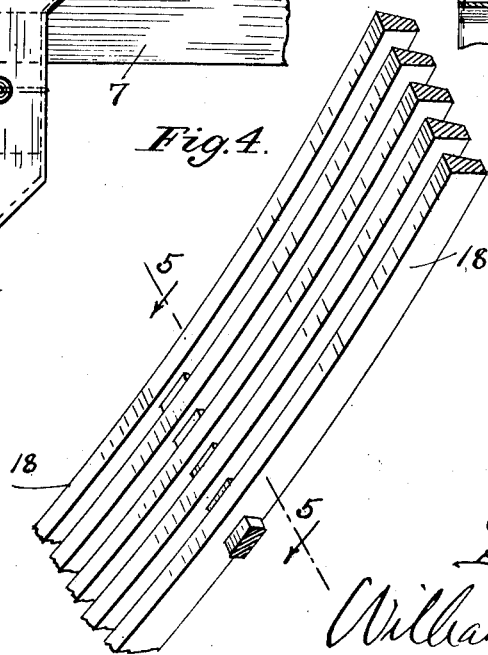

CHARLES P. NALL, OF MINNEAPOLIS, MINNESOTA.

GRAIN-SEPARATOR.

1,333,127.  Specification of Letters Patent.  Patented Mar. 9, 1920.

Application filed October 28, 1916. Serial No. 128,207.

*To all whom it may concern:*

Be it known that I, CHARLES P. NALL, a citizen of the United States, residing at Minneapolis, in the county of Hennepin and State of Minnesota, have invented certain new and useful Improvements in Grain-Separators; and I do hereby declare the following to be a full, clear, and exact description of the invention, such as will enable others skilled in the art to which it appertains to make and use the same.

My invention has for its particular object the provision of a simple and highly efficient grain separator, wherein an air blast is used as an impelling medium for forcing the grain over separating screens and through or past separating channels. To the above ends, generally stated, the invention consists of the novel devices and combinations of devices hereinafter described and defined in the claims.

The machine, while capable of more general use, is especially adapted for the separation of wheat and oats, which grains, as is well known, are not only of different shape, but also of different specific gravity. The preferred form of the separator is illustrated in the accompanying drawings wherein like characters indicate like parts throughout the several views.

Referring to the drawings:

Figure 1 is a view partly in side elevation and partly in vertical section, showing the complete machine or apparatus;

Fig. 2 shows the machine in rear elevation, some parts being broken away;

Fig. 3 is a transverse vertical section taken on the irregular line 3—3 of Fig. 1;

Fig. 4 is a perspective view showing a portion of the grate-like deflecting screen; and Fig. 5 is a section on the line 5—5 of Fig. 4.

The numerals 6 and 7 indicate, respectively, an upper and lower floor of a building in which the machine is installed, the floor 7, also, however, being usually a floor located above the ground floor.

The main casing 8 of the separator is secured on the floor 7 and it supports two fan casings 9 and 10, which fan casings, respectively, are provided with discharge spouts 9ª and 10ª. One of these fan casings is mounted for rotary adjustments and, as shown and preferred, it is the upper fan casing 10 that is thus mounted, the same being held between the side plates of the casing 8 and adjustably secured thereto by a nut-equipped bolt 11 carried by the said casing 10 and working in a slot 12 in the said side plates. Both of these fan casings are provided with axial air intake ports, and, working within the said casings 9 and 10, respectively are rotary fan heads 13 and 14, the shafts of which carry pulleys 13ª and 14ª, respectively, over which runs a belt 15. The shaft of the fan head 14 is also provided at its opposite end with a pulley 16 over which a power-driven belt 17 runs, so that both fan heads will be positively driven in the direction of the arrows marked on Fig. 1.

Secured within the main casing 8 below the fan casing 10 is a grate-like separating screen 18 made up of laterally spaced bars, preferably curved and so spaced that the good full-sized wheat will not pass between the same, but that shriveled or broken wheat and oats which are relatively long and narrow, may be blown through the same and into a chamber 19 formed in the casing 8 below said screen. This chamber 19 has an inclined bottom that leads to a depending discharge spout 20.

Below the lower extremity of the screen 18 is a depending channel or spout 21 that connects to the spout 20. Adjustably secured to the far side of the channel 21, by means of a slot and bolt connection 22, is a vertically adjustable so-called cut-off plate 23, the upper edge of which may be set flush with or above the said wall to which it is secured.

Extending downward and toward the left, in respect to Fig. 1 is a clean wheat receiving channel or spout 24 that has a depending and large portion 25 in which is a weighted normally closed but automatically opened gate 26.

The grain to be cleaned is delivered into a hopper 27 shown as secured to the overhead floor 6. This hopper is provided with a depending spout 28 that leads to the upper portion of the main casing 8 and delivers the grain directly onto the uppermost portion of the screen 18. Within the spout 28 is a gate 29, by means of which the flow of grain may be cut off or regulated, at will.

The fan plate of the casing 8 is provided with a normally closed door 8ª, which, when opened, affords access to the chamber 19.

The operation is substantially as follows:

By adjustment of the gate 29, the flow of grain may be regulated. This grain, assumed to be mixed wheat and oats, will be delivered under considerable velocity, directly against the inclined screen 18, and the blast of air from the upper fan delivered from an air spout 10ª will cause the grain to tightly hug the said screen while it is making its downward movement over the same. The effect of this combined action of gravity and air blast is to force at least some of the oats together with smaller seeds, dirt, dust, and the like, directly through the screen 18 and into the chamber 19, from whence it is delivered into the discharge spout 20. The wheat being heavier, smoother and wider than the oats, will travel with greater velocity over the inclined screen 18 and will have a much greater tendency to jump the gap formed by the spout 21, than will the oats. In fact, the velocity of the grain passing over and from the screen 18 may be so regulated that all of the wheat will jump the said gap and into the upper end of the spout 24. As the grain makes this jump across the said gap, it is passed through the downward blast from the air spout 9ª, the tendency of which blast is to force the same directly downward into the spout 21, but the wheat will always have a greater tendency to jump the gap and will travel at a higher altitude than will the lighter oats. The position of the fan casing 10 and its spout 10ª will vary materially the speed at which the grain will pass over the screen 18. For example, in the adjustment shown by full lines in Fig. 1, there will be a greater tendency to force the grain against the screen, and hence, a slower movement of the grain than there will be with the spout 10ª adjusted, as indicated by dotted lines in said Fig. 1. By these adjustments, a proper regulation can be made for the separation of the wheat from the oats, as above described, but the separation can be further regulated by vertical adjustments of the cut-off plate 23. For example, the higher the adjustment of the said plate 23, the less chance the oats will have to jump the gap at 21. By a little experience and experiments, the operator will be able to determine just when the fan casing 10 is properly set and the cut-off plate 23 is properly adjusted so that only the clean wheat will be delivered into the spout 23.

The screen 18, in a broad sense, is a deflecting plate, and might, in some instances, be made imperforate, in which, even the separation would have to take place entirely at the gap afforded by the spout 21. Much the best results, however, are attained by making the said grate perforate in the form of a screen, because a very large part of the separation may thus be performed while the grain is passing over the same. Even the grate-like construction of the screen is important, because the long narrow passages therein give a chance for the long narrow oats, in passing over the same to get into parallel relation therewith, so that they may pass through the same and into the chamber 19.

The machine above described, has been made and put into actual use, and has been found highly efficient for the separation of wheat and oats.

What I claim is:

1. In a separator of the kind described, the combination with a casing having an inclined screen therein, of means for delivering the grain or material to the upper portion of said screen, a fan arranged to deliver a current of air through said screen, said screen having a gap at its lower extremity, a spout located beyond said gap for receiving the cleaned grain or material, a second fan arranged to deliver a current of air through said gap, and an adjustable cut-off plate at the far side of said gap.

2. In a separator of the kind described, the combination with a casing having an inclined screen therein, of means for delivering the grain or material to the upper portion of said screen, a fan arranged to deliver a blast onto said screen, said screen having a gap at its lower extremity, a spout located beyond said gap for receiving the cleaned grain or material, a second fan arranged to deliver a blast through said gap, and means for circumferentially adjusting the delivery of one of said fans.

3. In a separator of the kind described, the combination with a casing having an inclined screen therein, of means for delivering the grain or material to the upper portion of said screen, a fan arranged to deliver a blast onto said screen, said screen having a gap at its lower extremity, a spout located beyond said gap for receiving the cleaned grain or material, a second fan arranged to deliver the downward blast over the said gap, and means for circumferentially adjusting the delivery of the first noted fan to thereby vary its point and angle of delivery against said screen.

In testimony whereof I affix my signature in presnce of two witnesses.

CHARLES P. NALL.

Witnesses:
CLARA DEMAREST,
BERNICE G. WHEELER.